United States Patent [19]

Wicnienski

[11] Patent Number: 5,316,444
[45] Date of Patent: May 31, 1994

[54] PUMP CONTROL AND METHOD OF PUMPING

[76] Inventor: Michael F. Wicnienski, 36903 Carol La., Lake Villa, Ill. 60046

[21] Appl. No.: 54,900

[22] Filed: Apr. 29, 1993

[51] Int. Cl.$^5$ ................................................. G01F 1/84
[52] U.S. Cl. ............................... 417/2; 417/17; 417/43; 417/53; 417/477 K; 73/861.38
[58] Field of Search ............... 417/2, 17, 43, 44 R, 417/53, 476, 475, 477

[56] References Cited

U.S. PATENT DOCUMENTS

| | | |
|---|---|---|
| 2,651,995 | 9/1953 | Blackburn ........................ 417/2 |
| 2,988,001 | 6/1961 | D'Arcey et al. . |
| 3,339,400 | 9/1967 | Banks . |
| 3,385,104 | 5/1968 | Banks . |
| 3,583,209 | 8/1971 | Banks . |
| 4,155,362 | 5/1979 | Jess . |
| 4,184,815 | 1/1980 | Casson . |
| 4,380,236 | 4/1983 | Norton ........................ 417/43 X |
| 4,418,774 | 12/1983 | Whitney et al. . |
| 4,513,796 | 4/1985 | Miller et al. . |
| 4,526,515 | 7/1985 | DeVries ........................ 417/475 X |
| 4,660,421 | 4/1987 | Dahlin et al. . |
| 4,685,326 | 8/1987 | Peterson . |
| 4,711,132 | 12/1987 | Dahlin . |
| 4,756,198 | 7/1988 | Levien . |
| 4,920,787 | 5/1990 | Dual et al. . |
| 4,984,472 | 1/1991 | Dahlin . |
| 5,027,662 | 7/1991 | Titlow et al. . |
| 5,054,318 | 10/1991 | Lew . |
| 5,060,523 | 10/1991 | Lew . |

Primary Examiner—Richard E. Gluck
Attorney, Agent, or Firm—Wood, Phillips, VanSanten, Hoffman & Ertel

[57] ABSTRACT

A pump control controls the rate at which liquid is pumped through a tube. The pump has a variable speed shaft with a roller thereon engaged with the tube between the tube inlet the tube outlet for pumping liquid from a supply toward the tube outlet when the pump shaft operates. A first sensor senses liquid at a first location in the tube and a second sensor senses liquid at a second location in the tube between the first location and the tube outlet. A vibratory beam is coupled with the tube between the first location and the second location. An electric circuit transfers energy to a magnet on the beam and induces a natural response in the beam and the tube. A microprocessor executes a software program and a) monitors operation of the pump when liquid is pumped into the tube between the sensors, b) measures the frequency of the induced natural response of the tube and liquid contained therein, c) computes the mass of liquid in the tube between the sensors, d) computes a pump rate as a function of the pump operation required to fill the tube between the sensors and the measured mass of liquid pumped into the tube and a desired flow rate, and e) operates the pump at the computed rate.

17 Claims, 4 Drawing Sheets

PUMP CONTROL AND METHOD OF PUMPING

BACKGROUND OF THE INVENTION

1. Technical Field

The present invention relates to pumps, and more particularly to a control and a method for controlling the rate at which liquid is pumped through a tube.

2. Background Art

Transfer of a liquid at a precise rate is a requirement of many liquid delivery systems such as, for example, intravenous chemical therapy systems wherein a solution, such as a saline solution or a solution containing medicine, is transferred by a pump from a supply to a patient requiring the solution. Safety and effectiveness of the therapy is affected by the degree of control with which the solution is transferred.

A peristaltic infusion pump typically is used to draw liquid from a container and pump the liquid through the outlet of a flexible tube. The peristaltic pump is connected to the tube between the container and the outlet and has a rotatable roller engaged with the tube exterior for periodically squeezing / collapsing the tube and pumping liquid through the tube.

The rate at which liquid is pumped through the tube by the peristaltic pump is a function of the speed at which the pump shaft rotates (that is, the pump speed) and the cross sectional area of the tube bore. The cross sectional area of a bore in a flexible tube can vary by plus and minus ten percent along the length of the tube. In addition, wear of the inner surface of a tube results in a change in the tube bore cross sectional area. Squeezing of a tube by a peristaltic pump can cause the circumference of the tube to expand whereby the enclosed area of a cross section of the tube increases. Pump speed must be continuously compensate for variations in the cross sectional area of a tube to maintain a desired flow rate of liquid in a tube.

SUMMARY OF THE INVENTION

A pump control controls the rate at which liquid is pumped through a tube. The pump has one or more rollers mounted on a variable speed rotatable shaft and engaged with a tube between the tube inlet the tube outlet for pumping liquid from a supply toward the tube outlet. A first sensor senses liquid at a first location in the tube and a second sensor senses liquid at a second location in the tube between the first location and the tube outlet. A vibratory beam is coupled with the tube between the first location and the second location. An electric circuit transfers energy to a magnet on the beam and induces a natural response in the beam and the tube. A microprocessor executes a software program and a) monitors operation of the pump when liquid is pumped into the tube between the sensors, b) measures the frequency of the induced natural response of the tube and liquid contained therein, c) computes the mass of liquid in the tube between the sensors, d) computes a pump rate as a function of the pump operation required to fill the tube between the sensors and the measured mass of liquid pumped into the tube and a desired flow rate, and e) operates the pump at the computed rate.

The invention also contemplates a method of pumping liquid through a tube. The method includes the steps of measuring the natural frequency and computing the mass of a portion of a tube between a first location in the tube and a second location in the tube when the tube is empty. The pump shaft then rotates at a first rate to pump liquid from a supply through the tube. Rotation of the pump shaft is monitored when liquid reaches the first location in the tube. Operation of the pump is discontinued when liquid reaches the second location in the tube. The natural frequency of the tube and liquid in the tube is measured and the corresponding mass is computed. A second pump rate is computed as a function of the monitored pump operation and the measured liquid mass and a desired flow rate and the pump shaft is rotated at the second pump rate.

In an alternative embodiment, a pump control has two variable speed pumps for pumping liquid into and out of a vented chamber interconnected to a tube between the pumps. A first sensor senses liquid at a first location in the tube and a second sensor for senses liquid at a second location in the tube between the first location and the tube outlet. The chamber is connected to the tube between the first sensor and the second sensor. A vibratory beam is coupled with the chamber and an electric circuit transfers energy to a magnet on the beam and induces a natural response in the beam and the chamber.

A microprocessor executes a software program and a) rotates the first pump shaft to pump liquid into the chamber until the natural frequency of the chamber and liquid therein equals a first predetermined frequency representative of a first mass of liquid in the chamber, b) rotates the second pump shaft until liquid is sensed by the second sensor, and c) again rotates the first pump shaft to pump liquid into the chamber until the natural frequency of the chamber and liquid therein equals the first predetermined frequency.

The microprocessor d) monitors rotation of the second pump shaft while pumping liquid from the chamber at a first rate until the natural frequency of the chamber and liquid therein equals a second predetermined frequency representative of a second mass of liquid in the chamber. The microprocessor then e) computes a second rotation rate for the second pump shaft as a function of the monitored rotation of the second pump shaft and the difference between the first volume and the second volume and a desired flow rate, and f) rotates the first pump shaft at a rate greater than the first rate and pumps liquid into the chamber until the natural frequency of the chamber and liquid therein equals the first predetermined frequency. The microprocessor g) rotates the second pump shaft at the second rate while rotating the first pump shaft.

DETAILED DESCRIPTION OF THE INVENTION

Figure 1:
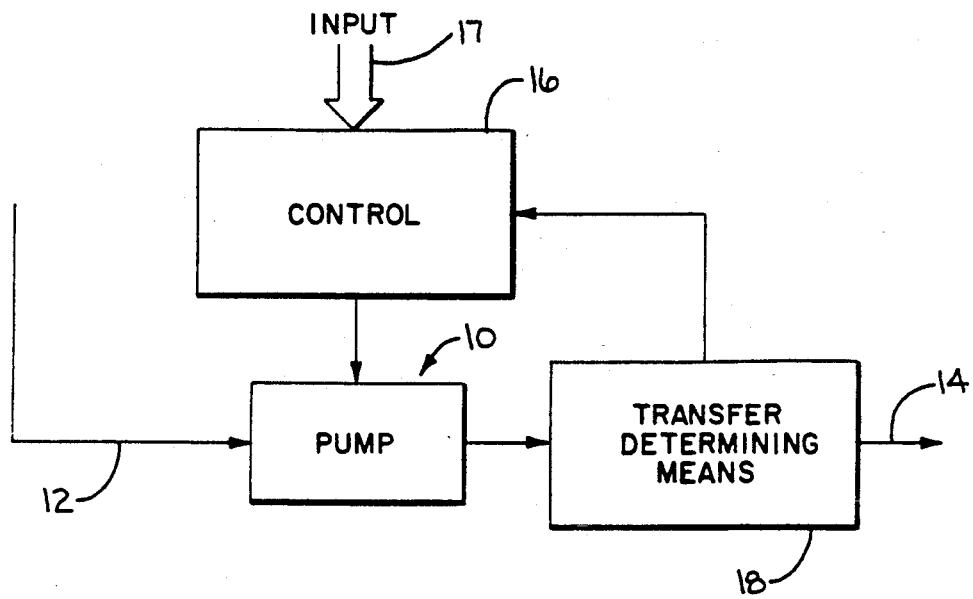
FIG. 1 is a block diagram of a pump control according to the present invention.

FIG. 1 is a block diagram of a liquid transfer system having a control according to the present invention. Pumping means, generally designated 10, receives liquid 12 from a supply (not shown) and pumps an output flow 14 to a recipient or liquid receptacle. A control 16 is connected to the pumping means 10 and receives a user input 17 to control the pumping means 10 so that a desired flow rate of the outlet flow 14 is achieved. Transfer determining means 18 are connected to the pump means 10 and the control 16. The transfer determining means 18 determine the actual flow rate of the output flow 14 and provide a signal representative of the difference between the actual flow rate and the input flow rate 17. The control 16 compensates for the difference and adjusts the pumping rate so that the desired output flow rate is achieved.

Figure 2:
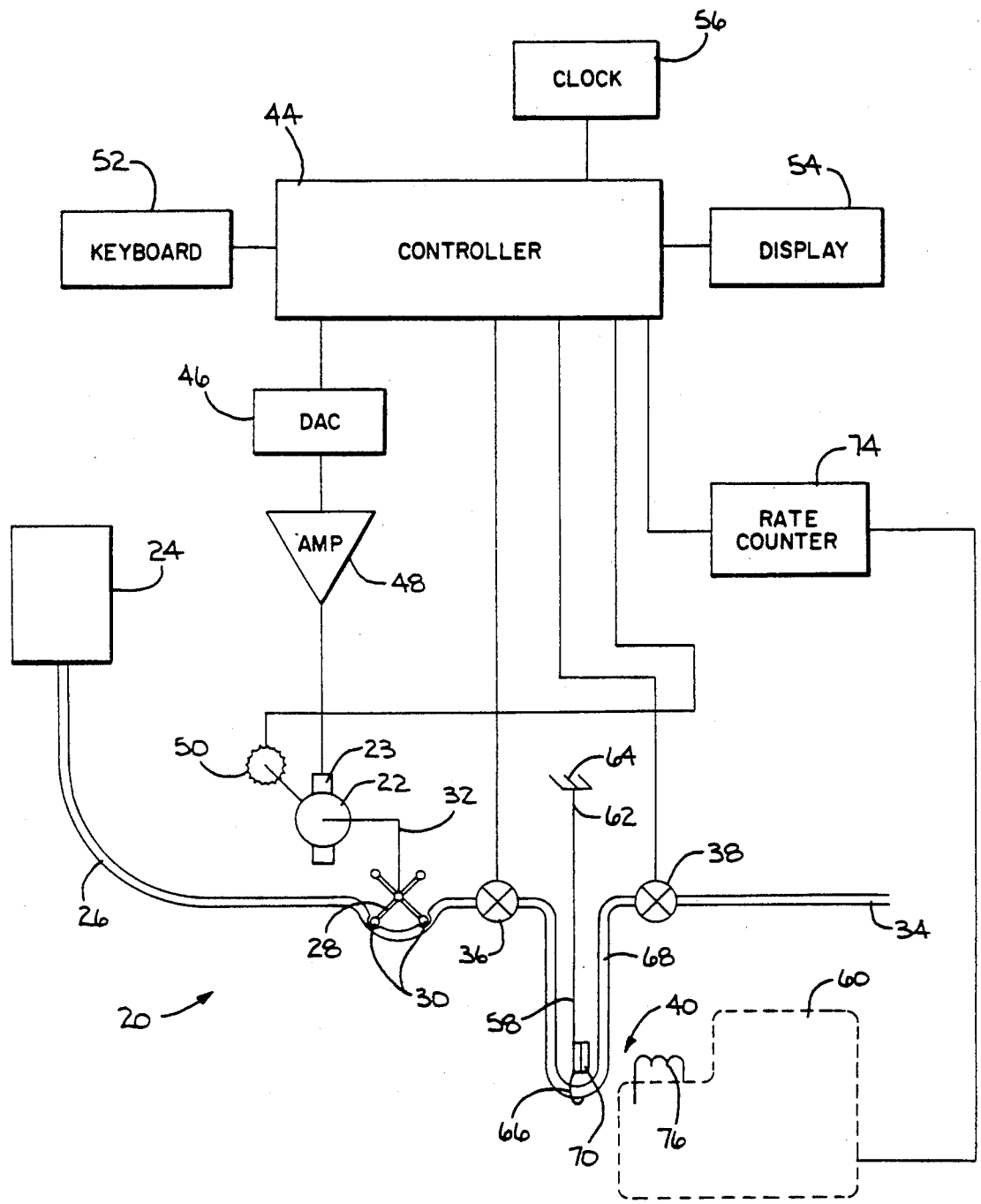
FIG. 2 is a schematic drawing of the pump control.

FIG. 2 schematically illustrates a liquid transfer system 20 having a variable speed pump 22 for pumping liquid from a supply 24 through a flexible tube 26. The pump 22 has a roller assembly 28 with a plurality of rollers 30 rotatably supported on a pump shaft 32. Rotation of the pump shaft 32 causes each roller 30 to sequentially engage the tube 26 and progressively squeeze / collapse the tube 26 to pump liquid from the supply 24 to the tube outlet 34. A first sensor 36 senses liquid at a first location on the tube 26 and a second sensor 38 senses liquid at a second location on the tube 26. Mass measurement means, generally designated 40 (described below), generate a signal representative of the mass and volume of liquid contained in the tube 26 between the first sensor 36 and the second sensor 38.

A microprocessor controller 44 is connected to the first sensor 36, the second sensor 38, and the mass measurement means 40. A digital-to-analog (D/A) converter 46 and an amplifier 48 are interconnected between the controller 44 and the pump 22. A digital shaft encoder 50 on the pump shaft 32 provides a signal (i.e., pulses) to the controller 44 which is representative of the rotation of the pump shaft 32. The controller 44 has a keyboard 52 for receiving data input from an operator, a display 54 for providing visual output to an operator, and a clock 56.

The mass measurement means 40 has a beam 58 and an electrical driver circuit 60 for vibrating the beam 58. The beam 58 preferably is a flexible reed having a known transverse stiffness, that is, having a known coefficient of elasticity in a direction substantially perpendicular to the length of the reed. One end 62 of the beam 58 is secured to a fixed base 64 and an opposite end 66 of the beam 58 is connected to a generally U-shaped portion 68 of the tube 26 between the sensor 36 and the sensor 38. The beam 58 and the tube portion 68 are rigidly connected so that the tube portion 68, the beam 58 and any liquid in the tube portion 68 vibrate as a single mass when the beam 58 is vibrated by the driver circuit 60. A permanent magnet 70 is mounted on the end 66 of the beam 58.

Figure 3:
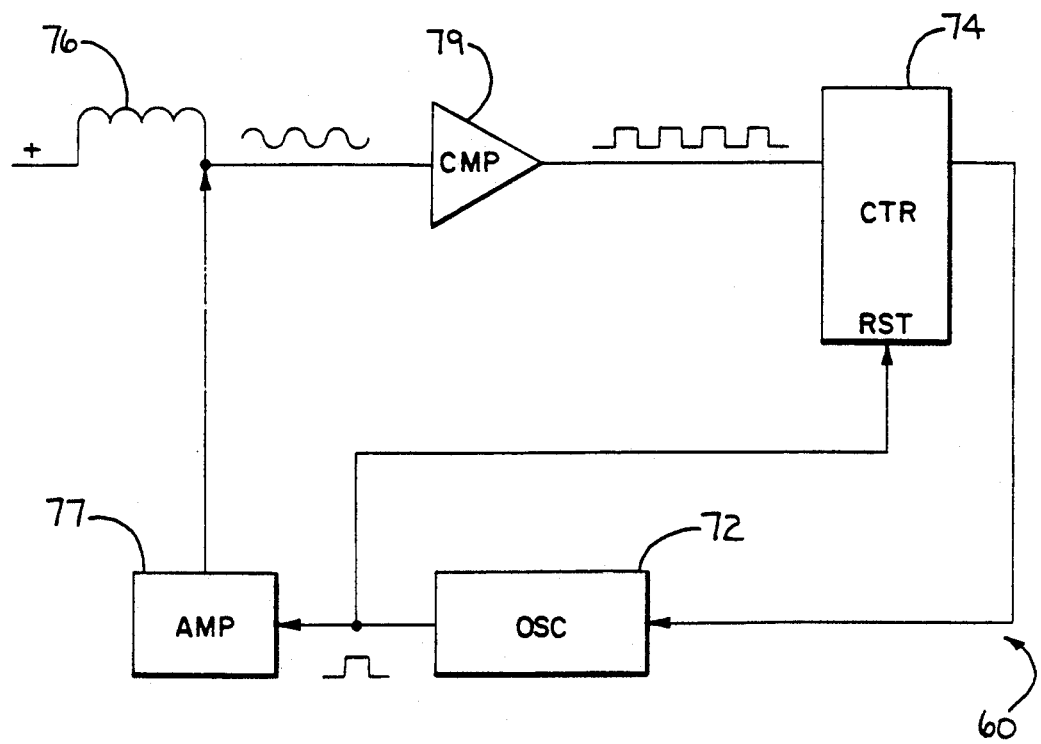
FIG. 3 is a schematic drawing of a driver circuit in the pump control.

The driver circuit 60 (see also FIG. 3) has a monostable oscillator 72, a rate counter 74 and a coil (inductor) 76. The oscillator 72 generates a pulse which is amplified by an amplifier 77 and transfers energy to the magnet 70 to vibrate the beam 58 and the portion 68 of the tube 26. The vibratory response of the beam 58 decays at the natural frequency of the lumped system defined by the beam 58, the tube portion 68, and liquid in the tube portion 66. Oscillatory displacement of the magnet 70 induces a current in the inductor 76 having a frequency equal to the vibratory frequency of the magnet 70. The frequency of the induced current thus is representative of the natural frequency of the lumped system. A comparator 79 receives the induced current and supplies a pulsed signal to the counter 74 with the period of the signal (that is, the time between consecutive pulses received by the counter 74) equal to the period of oscillation of the beam. The counter 74 measures cycles of the induced current and triggers the generation of additional pulses after a predetermined number of cycles are counted. The oscillator 72 generates pulses at a frequency less than frequency of the natural vibratory response of the beam 58 and the tube portion 68 (that is, at a subharmonic frequency relative to the natural or resonant frequency of the lumped system).

The natural frequency $\omega_n$ at which a physical system vibrates in a particular degree of freedom (that is, in a particular direction) is expressed as $$\omega_n = (k/m)^{\frac{1}{2}}$$

where k is the stiffness of the system in the particular direction and m is the mass of the system. The natural frequency $\omega_n$ also is a function of the period of oscillation T of a vibratory system:

$$\omega_n = 2\pi / T$$

Since the beam 58 has a known transverse stiffness, the mass of the lumped system is determined by substituting the measured period in the equation $$m = k / (2\pi / T)^2$$

Figure 4:
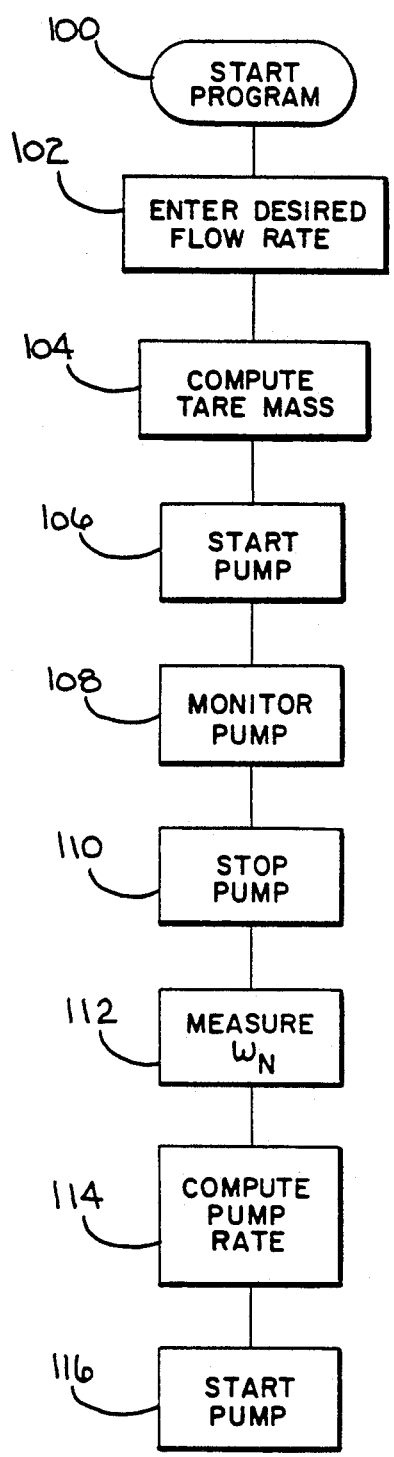
FIG. 4 is a flow chart showing the method of operating the pump control.

Operation of the liquid transfer system 20 is governed by instructions contained in a software program in the microprocessor controller 44. FIG. 4 is flow chart which illustrates the method of operating the liquid transfer system 20.

The software program manually is started by an operator at block 100. At block 102, the controller 44 prompts the operator with a visual message on the display 54 to enter a desired output flow rate into the controller 44 with the keyboard 52. Mass measuring means 40 operate at block 104 in the manner discussed above and measure the tare mass of the U-shaped portion 68 of the tube 26 between the sensor 36 and the liquid sensor 38. The tare mass measuring step alternatively can be conducted simultaneously with or prior to input of the desired output flow rate.

At block 106 the controller 44 operates the pump 22 at a fraction of its maximum pumping rate by presenting a binary number to the D/A converter 46. Pulses from the digital shaft encoder 50 are accumulated by the controller 44 and a 0 is assigned to a counter associated with the clock 56 when sensor 36 senses liquid (block 108). The controller 44 stops the pump 22 when the sensor 38 senses liquid and thus indicates that the U-shaped tube portion 68 is full of liquid (block 110).

The mass measuring means 40 determine the period of oscillation and corresponding natural frequency of the coupled beam 58 and the tube portion 68 as well as liquid contained in the tube portion 68 at block 112. The controller 44 then computes the mass of the liquid contained in the tube portion 68 by subtracting the previously measured tare mass of the beam 58 and the tube portion 68 from the measured mass of the full tube portion 68. The time required to achieve the measured mass transfer is measured by reference to the number of clock pulses accumulated between the time the sensor 36 senses liquid and the time the sensor 38 senses liquid. The number of rotations of the pump shaft 32 required to achieve the measured mass transfer is based on the number of encoder pulses counted. Pump speed is calculated as the number of shaft encoder pulses divided by the amount of time during which the pulses are counted. Liquid transfer per shaft encoder pulse is calculated by dividing the measured mass of liquid in the tube portion 68 by the number of shaft encoder pulses counted when the tube portion 68 fills.

Operation of the pump 22 is resumed at block 116 and the D/A converter 46 is incremented or decremented, depending on whether the desired flow rate is greater than or less than the measured flow rate. The D/A converter 46 is incremented or decremented until the number of shaft encoder pulses counted per unit time corresponds to the desired flow rate.

The following example illustrates the manner in which the controller 44 achieves the foregoing object. The values listed in the illustrative example are hypothetical and are provided only to facilitate an understanding of the invention.

In an exemplary liquid transfer application, an operator enters a desired output flow rate of 10 ml/hr into the controller 44 with the keyboard 152. Pulses from the shaft encoder 50 are accumulated at an exemplary rate of 60 pulses per revolution of the pump shaft 32 after liquid reaches the sensor 36. The controller 44 stops the pump 22 when the second sensor 38 senses liquid. The mass measurement means 40 may measure, for example, 1 ml of liquid in the tube portion 68, the clock 56 may indicate the pump 22 operated for 0.25 hours, and 300 shaft encoder pulses may accumulate. The pump speed thus is computed as:

300 encoder pulses
/ 60 pulses per revolution
/ .25 hrs =
    20 revolutions per hour The flow rate is computed as:
1 ml /
  .25 hrs =
    4 ml/hour Since the desired output flow rate in the illustrative example is 10 ml/hour, the rate of the pump 22 must be increased by a factor of 2.5 to achieve the desired output flow rate. In the example, encoder pulses accumulated at the rate of 1200 pulses per hour. In order to achieve the desired output flow rate of 10 ml/hr, the D/A converter 46 is incremented until the number of shaft encoder pulses per unit time equals 3000 pulses per hour, that is, until the period between consecutive pulses is 1.2 seconds (3600 seconds / 300 pulses). The only hardware requirement essential to achieve the above operation is that the clock frequency of the clock 76 be greater than the natural frequency $\omega_n$ of the system such that the time between execution of consecutive instructions by the microprocessor 150 is less than the vibratory period of the excited beam 58.

Figure 5:
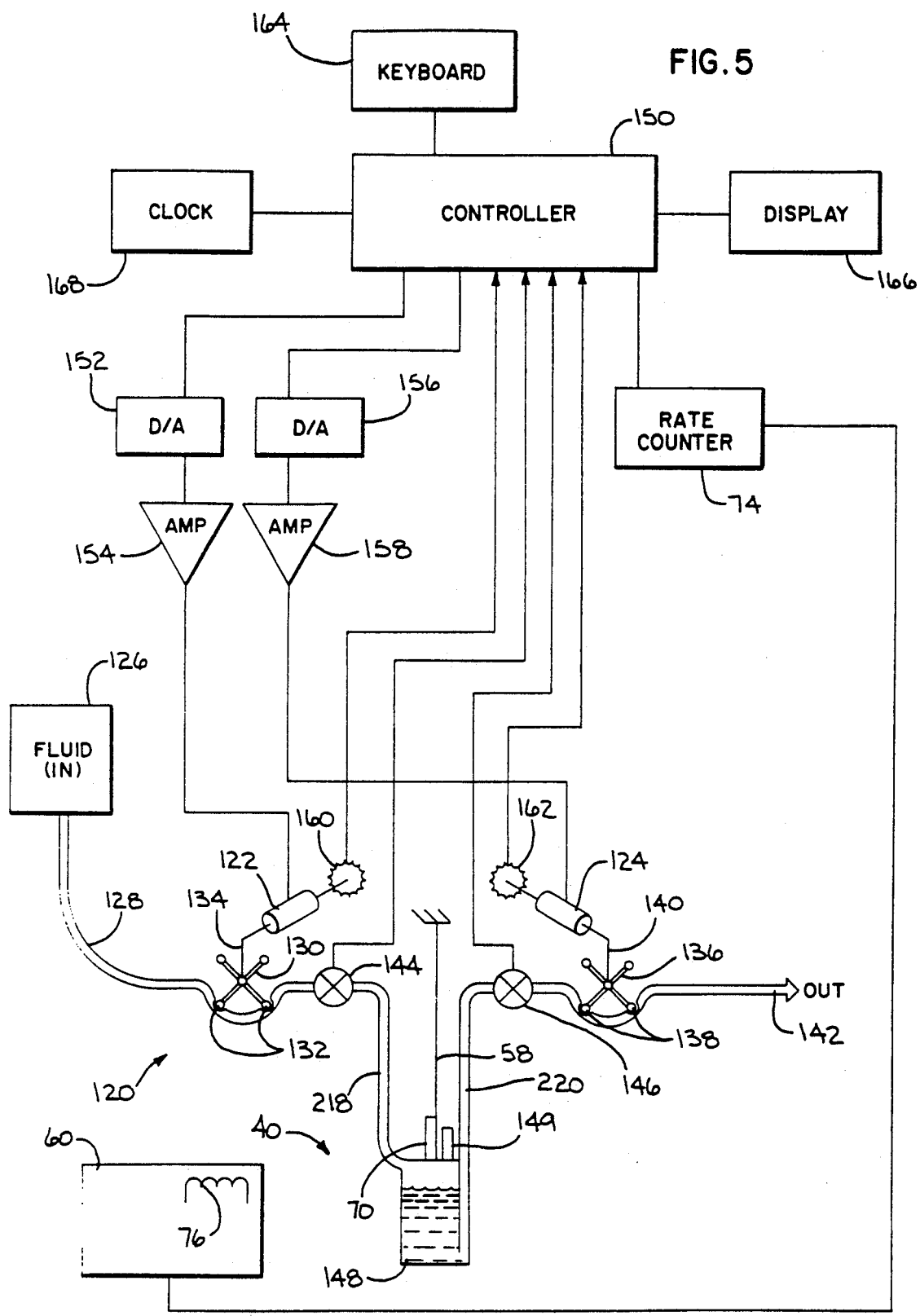
FIG. 5 is a schematic drawing of an alternative pump control.

FIG. 5 schematically illustrates an alternative liquid transfer system 120 having a first pump 122 and a second pump 124 for pumping liquid from a supply 126 through a flexible tube 128. The pump 122 has a roller assembly 130 with a plurality of rollers 132 rotatably supported on a pump shaft 134. The pump 124 has a roller assembly 136 with a plurality of rollers 138 rotatably supported on a pump shaft 140. Rotation of the pump shaft 134 and the pump shaft 140 causes the corresponding rollers 132 and 138 to sequentially engage the tube 128. The tube 128 periodically contracts and pumps liquid from the supply 126 to the tube outlet 142. A first sensor 144 senses liquid at a first location on the tube 128 and a second sensor 146 senses liquid at a second location on the tube 128. The tube 128 is connected to a chamber 148 between the sensor 144 and the sensor 146. Mass measurement means 40 (described above) generate a signal representative of the natural frequency of the chamber 148 and liquid contained in the chamber 148.

A microprocessor controller 150 is connected to the first sensor 144, the second sensor 146, and the mass measurement means 40. A digital-to-analog converter 152 and an amplifier 154 are interconnected between the controller 150 and the pump 122. A digital-to-analog converter 156 and an amplifier 158 are interconnected between the controller 150 and the pump 124. A digital encoder 160 on the pump shaft 134 provides a signal to the controller 150 which is representative of the amount of rotation of the pump shaft 134. A digital encoder 162 on the pump shaft 140 provides a signal (i.e., a number of pulses) to the controller 150 which is representative of the amount of rotation of the pump shaft 140. The controller 150 also has a keyboard 164 for receiving user input, a display 166 for providing user output, and a clock 168.

Figure 6:
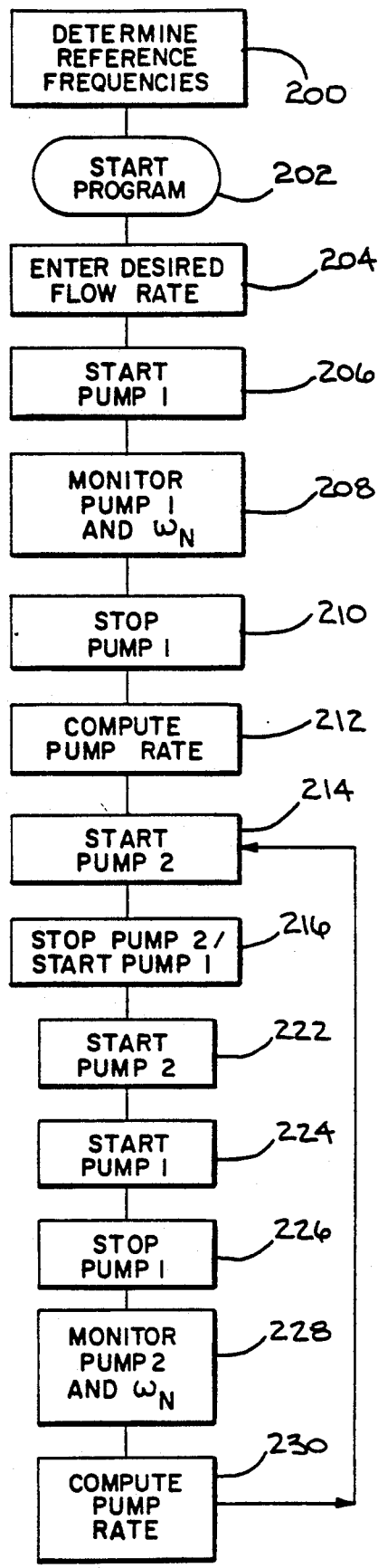
FIG. 6 is a flow chart showing the method of operating the alternative pump control.

Operation of the liquid transfer system 120 is governed by instructions contained in a software program in the microprocessor controller 150. FIG. 6 is a flow chart which illustrates the method of operating the liquid transfer system 120.

Initially (block 200) the mass measurement means 40 is operated independently of the pumps 122 and 124 to determine the natural frequencies corresponding to a target low mass (and volume) of liquid in the chamber 148 and a target high mass (and volume) of liquid in the chamber 148. That is, when the liquid system 120 operates, the volume of liquid in the chamber 148 varies between a target low volume and a target high volume. The chamber 148 has a first natural frequency when the chamber 148 contains the target low volume of liquid and the chamber 148 has a second natural frequency when the chamber 148 contains the target high volume of liquid. Prior to starting the program in the controller 150, the target low volume of liquid is placed in the chamber 148 and the corresponding natural frequency of the chamber 148 is measured with the mass measuring means 40. The target high volume of liquid then is placed in the chamber 148 and the corresponding natural frequency of the chamber 148 is transduced with the mass measuring means 40.

In an exemplary liquid transfer application, the volume of liquid in the chamber 148 varies between 3 ml (the target low volume) and 6 ml (the target high volume). The chamber 148 has a natural frequency of 32 Hz when 3 ml of liquid is in the chamber, and the chamber 148 has a natural frequency of 25 Hz when 6 ml of liquid is in the chamber.

The software program manually is started by an operator at block 202 after the frequencies corresponding to the target low volume and target high volume are determined. At block 204 the controller 150 prompts the operator with a message on the display 166 to enter a desired output flow rate into the controller 150 with the keyboard 164.

At block 206 the controller 150 operates the pump 122 at a fraction of its maximum rate by presenting a binary number to the D/A converter 152. The mass measuring means 40 begin monitoring the natural frequency of the chamber 148 when the sensor 144 senses liquid. Pulses from the digital shaft encoder 160 are accumulated by the controller 150 and a 0 is assigned to a counter associated with the clock 160 when the natural frequency of the chamber 148 equals the frequency corresponding to the target low volume of liquid. Air in the tube 128 is exhausted through a vent 149 in the chamber 148. The controller 150 stops the pump 122 when the natural frequency of the chamber 148 equals the frequency corresponding to the target high volume of liquid. In the exemplary embodiment, the pump 122 stops pumping when the natural frequency of the chamber 148 is 32 Hz.

A pump rate for the pump 124 is computed at block 212 based on the measured performance of the pump 122. That is, in a manner similar to the embodiment discussed above with regard to FIGS. 2-4, a pump rate for the pump 124 is calculated as a function of the desired output flow rate and the number of encoder pulses and clock pulses measured between the times at which the chamber 148 contains the target low volume and the target high volume.

The pump 124 pumps liquid from the chamber 148 at the computed pump rate (block 214) until the sensor 146 senses liquid present and thereby indicates that the tube 128 between the chamber 148 and the sensor 144 is filled with liquid. The controller 150 then stops the pump 124 and starts the pump 122 (block 216). The pump 122 pumps liquid from the supply 126 into the chamber 148 until the target high volume of liquid is contained in the chamber 148 (that is, in the exemplary application, until the mass measurement means 40 determines that the natural frequency of the chamber 148 is 25 Hz). The blocks 212, 214 and 216 thus purge entrained air from the inlet portion 218 of the tube 128 between the sensor 144 and the outlet portion 220 of the tube 128 between the chamber 148 and the sensor 146. Entrained air is purged through the vent 149 in the chamber 148. As an alternative to using a vented chamber 148, an elastic chamber or bellows could be used to accommodate expansion when air from the tube 128 is forced into the chamber 148. Control passes to block 222 after the purge step is completed.

The pump 124 pumps liquid from the chamber 148 at the rate computed in block 212 until the transduced natural frequency of the chamber 148 equals the frequency representative of the target low volume of liquid in the chamber. The controller 150 then operates the pump 122 (block 224) at twice the rate computed in block 212 while the pump 124 continues to operate. Liquid accumulates in the chamber 148 because the pump 122 operates at a greater rate than the pump 124. The controller 150 stops the pump 122 (block 226) when the transduced natural frequency of the chamber 148 equals the frequency representative of the target high volume of liquid in the chamber 148. Control then passes to block 228.

When the transduced frequency equivalent of the mass/volume of liquid in the chamber 148 reaches the target high value (block 228), a counter associated with the clock 168 is zeroed and clock pulses and pulses from the shaft encoder 162 are accumulated until the transduced frequency again reaches the value corresponding to the target low mass/volume. The actual liquid transfer characteristics are computed (block 230) from the data and a new pump rate is calculated for the pump 124. Control passes to block 222 and the pump 124 is operated at the new pump rate computed in block 230. The time required to compute a new pump rate takes a few milliseconds.

The pump 122 is energized to again fill the chamber 148 at a rate twice as great as the computed new outflow rate until the mass measurement means 40 detect a natural frequency representative of the target high mass/volume. The process repeats until the sensor 139 indicates an empty condition for the supply 126. The sensor 144 can be regularly interrogated to determine an unwanted discontinuity in liquid flow, such as when air is entrained in the flow.

I claim:

1. A pump control for controlling flow through a tube, the tube having an inlet connected to a supply of liquid and an outlet, the pump control comprising:
   a variable speed pump having a rotatable shaft and a roller mounted on the shaft, the roller being engaged with the tube between the tube inlet the tube outlet for pumping liquid from the supply toward the outlet when the shaft rotates;
   a first sensor for sensing liquid at a first location in the tube;
   a second sensor for sensing liquid at a second location in the tube between the first location and the tube outlet;
   means for measuring the natural frequency of the tube and liquid contained in the tube between the first location and the second location;
   a microprocessor control connected to the pump, the first and the second sensors and the natural frequency measuring means, for
   a) computing the mass of the portion of the tube between the first and the second sensors as a function of the natural frequency measured when the tube is empty,
   b) rotating the pump shaft at a first pump rate to pump liquid from the supply through the tube,
   c) discontinuing rotation of the pump shaft when liquid is sensed by the second sensor,
   d) determining the amount of rotation of the pump shaft and the length of time between when liquid is sensed by the first sensor and when liquid is sensed by the second sensor,
   e) computing the mass of the portion of the tube and liquid contained therein between the first location and the second location as a function of the natural frequency measured when the second sensor senses liquid,
   f) computing the mass of fluid between the first location and the second location,
   g) computing a second pump rate as a function of a desired flow rate, the computed liquid mass and the determined amount of rotation of the pump shaft and the length of time between when liquid is sensed by the first sensor and when liquid is sensed by the second sensor, and
   h) rotating the pump shaft at the second pump rate.

2. The pump control of claim 1 in which the means for measuring the natural frequency of the tube and liquid contained in the tube comprises means for inducing a natural vibratory response of the tube portion and means for measuring the frequency of said natural response.

3. The pump control of claim 1 having a beam secured at one end to a fixed base and connected to the tube, a magnet on the beam, and an electric circuit for transferring energy to the magnet and thereby causing the beam and the tube to vibrate and induce a natural vibratory response therein.

4. The pump control of claim 3 in which the electric circuit has an inductor wherein vibration of said magnet induces a current having a frequency of oscillation equivalent to the natural frequency of vibration of the tube and liquid in the tube.

5. The pump control of claim 4 including means for measuring the frequency of said induced current and exciting said beam at a frequency less than said measured frequency.

6. A method of pumping liquid through a tube, the tube having an inlet connected to a supply of liquid and an outlet, a variable speed pump having a rotatable shaft and a roller mounted on the shaft, the roller being engaged with the tube between the tube inlet the tube outlet for pumping liquid from the supply toward the outlet when the shaft rotates, the method comprising the steps of:

measuring a first natural frequency of the portion of the tube between a first location in the tube and a second location in the tube when the tube is empty;

computing the mass of the portion of the tube between said first and second locations as a function of said measured first natural frequency;

rotating the pump shaft at a first pump rate to pump liquid from the supply through the tube;

discontinuing rotation of the pump shaft when liquid reaches the second location in the tube;

determining the amount of rotation of the pump shaft and the length of time between when liquid reaches the first location and when liquid reaches the second location;

measuring a second natural frequency of the portion of the tube and liquid contained therein between the first location and the second location when liquid reaches the second location in the tube;

computing the mass of the portion of the tube and liquid contained therein between the first location and the second location as a function of the measured second natural frequency;

computing the mass of liquid between the first location and the second location;

computing a second pump rate as a function of a desired flow rate, the computed liquid mass and the determined amount of rotation of the pump shaft and the length of time between when liquid is sensed by the first location and when liquid is sensed by the second location; and rotating the pump shaft at the second pump rate.

7. The method of claim 6 wherein said steps of measuring the first and second natural frequency comprises the step of vibrating said tube between said first location and said second location and inducing a natural response therein.

8. A pump control for controlling flow through a tube, the tube having an inlet connected to a supply of liquid and an outlet, the flow control comprising:

a first sensor for sensing liquid at a first location in the tube;

a second sensor for sensing liquid at a second location in the tube between the first location and the tube outlet;

a chamber connected to the tube between the first and second sensors;

a first variable speed pump having a rotatable shaft and a roller mounted on the shaft, the roller being engaged with the tube between the tube inlet the tube outlet for pumping liquid from the supply toward the chamber when the first pump shaft rotates;

a second variable speed pump having a rotatable shaft and a roller mounted on the shaft, the roller being engaged with the tube between the tube inlet the tube outlet for pumping liquid from the supply toward the chamber when the second pump shaft rotates;

means for measuring the natural frequency of the chamber and liquid contained in the chamber;

a microprocessor control connected to the first and second pumps, the first and second sensors and the natural frequency measuring means for performing the steps of a) iteratively rotating the first and second pump shafts to pump liquid from the supply into the chamber until the natural frequency of the chamber and liquid therein equals a first predetermined frequency representative of a first mass of liquid in the chamber and liquid is sensed by the second sensor;

b) rotating the second pump shaft at a first rate to pump liquid from the chamber through the tube until the natural frequency of the chamber and liquid therein equals a second predetermined frequency representative of a second mass of liquid in the chamber;

c) determining the amount of rotation of the second pump shaft and the length of time between when the chamber contains the first mass of liquid and when the chamber contains the second mass of liquid;

d) computing a second rate for the second pump shaft as a function of a desired flow rate, the difference between the first mass and the second mass, and the determined amount of rotation of the pump shaft and the length of time between when the chamber contains the first mass of liquid and when the chamber contains the second mass of liquid;

e) rotating the first pump shaft at a rate greater than the second rate of the second pump shaft when the mass of liquid in the chamber equals said first mass; and f) iteratively recomputing a new rate for the second pump shaft when the natural frequency of the chamber and liquid therein equals the second predetermined frequency representative of the second mass of liquid in the chamber, whereby liquid having a mass equal to at least said first mass is maintained in the chamber while said first and second pump shafts rotate until the supply is exhausted.

9. The pump control of claim 8 in which the means for measuring the natural frequency of the tube and liquid contained in the tube comprises means for inducing a natural vibratory response of the tube and means for measuring the frequency of said natural response.

10. The pump control of claim 8 having a beam secured fixed at one end and connected to the tube, a magnet on the beam, and an electric circuit for transferring energy to the magnet and thereby causing the beam and the tube to vibrate and induce a natural response therein.

11. The pump control of claim 10 in which the electric circuit has an inductor wherein vibration of said magnet induces a current having a frequency of oscillation equivalent to the natural frequency of vibration of the tube and liquid in the tube.

12. The pump control of claim 11 including means for measuring the frequency of oscillation of said induced current and vibrating said beam at said measured frequency.

13. The pump control of claim 8 in which the chamber has a vent.

14. The pump control of claim 8 in which the chamber is expandable.

15. A method of pumping liquid through a tube, the tube having an inlet connected to a supply of liquid and an outlet, a first variable speed pump having a rotatable shaft and a roller mounted on the shaft, the roller being engaged with the tube between the tube inlet the tube outlet for pumping liquid from the supply toward the chamber when the first pump shaft rotates, a second variable speed pump having a rotatable shaft and a roller mounted on the shaft, the roller being engaged with the tube between the tube inlet the tube outlet for pumping liquid from the supply toward the chamber when the second pump shaft rotates, a chamber being connected to the tube between the first pump and the second pump, the method comprising the steps of:

iteratively rotating the first and second pump shafts to pump liquid from the supply into the chamber until the natural frequency of the chamber and liquid therein equals a first predetermined frequency representative of a first mass of liquid in the chamber and liquid is sensed by the second sensor;

rotating the second pump shaft at a first rate to pump liquid from the chamber through the tube until the natural frequency of the chamber and liquid therein equals a second predetermined frequency representative of a second mass of liquid in the chamber;

determining the amount of rotation of the second pump shaft and the length of time between when the chamber contains the first mass of liquid and when the chamber contains the second mass of liquid;

computing a second rate for the second pump shaft as a function of a desired flow rate, the difference between the first mass and the second mass, and the determined amount of rotation of the pump shaft and the length of time between when the chamber contains the first mass of liquid and when the chamber contains the second mass of liquid;

rotating the first pump shaft at a rate greater than the second rate of the second pump shaft when the mass of liquid in the chamber is less than said first mass; and recomputing the second rate for the second pump shaft when the natural frequency of the chamber and liquid therein equals the second predetermined frequency representative of the second mass of liquid in the chamber, whereby liquid having a mass equal to at least said first mass is maintained in the chamber while said first and second pump shafts rotate until the supply is exhausted.

16. The method of claim 15 wherein said step of measuring the natural frequency comprises the step of vibrating said tube between said first location and said second location and inducing a natural response therein.

17. The method of claim 15 including the step of rotating the first roller at a rate twice as great as the second rate to pump liquid from the supply through the tube until the natural frequency of the chamber and liquid therein equals the first predetermined frequency.

* * * * *